US009392049B2

(12) United States Patent
Ennis et al.

(10) Patent No.: US 9,392,049 B2
(45) Date of Patent: Jul. 12, 2016

(54) AUTOMATIC CONTENT FORWARDING TO COMMUNICATION NETWORKS OF CONTENT POSTED FROM A USER

(75) Inventors: Patrick John Ennis, Fall City, WA (US); Alexander Knight, Seattle, WA (US); Vlad Grigore Dabija, Mountain View, CA (US); Timothy Martin Londergan, Seattle, WA (US); Dominic Dan Suciu, Edmonds, WA (US); Raghuram Madabushi, Seattle, WA (US); David Walter Ash, Bellevue, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 169 days.

(21) Appl. No.: 13/823,104

(22) PCT Filed: Jun. 19, 2012

(86) PCT No.: PCT/US2012/043067
§ 371 (c)(1),
(2), (4) Date: Mar. 13, 2013

(87) PCT Pub. No.: WO2013/191681
PCT Pub. Date: Dec. 27, 2013

(65) Prior Publication Data
US 2014/0032663 A1   Jan. 30, 2014

(51) Int. Cl.
*G06F 15/16* (2006.01)
*H04L 29/08* (2006.01)

(52) U.S. Cl.
CPC ............ *H04L 67/10* (2013.01); *H04L 67/1002* (2013.01)

(58) Field of Classification Search
CPC ..... H04L 67/10; H04L 67/327; H04L 45/306; H04L 63/123; H04L 51/00; H04L 51/02; H04L 51/04; G06F 15/16
USPC .......................................................... 709/204
See application file for complete search history.

(56) References Cited

U.S. PATENT DOCUMENTS

| 7,916,322 B2* | 3/2011 | Pineau | H04L 67/06 358/1.15 |
| 8,045,455 B1* | 10/2011 | Agronow | G01C 21/3415 370/229 |

(Continued)

OTHER PUBLICATIONS

Moidu, Sameer, Share Photos and Videos Anywhere You Have Email, The Facebook Blog Jul. 22, 2009. Retrieved Apr. 7, 2012 from URL: <https://blog.facebook.com/blog.php?post=109768117130>.

(Continued)

*Primary Examiner* — Kevin Bates
*Assistant Examiner* — Golam Mahmud
(74) *Attorney, Agent, or Firm* — Turk IP Law, LLC (57) ABSTRACT

Technologies are provided for identifying context associated with received content and automatically forwarding the content to an associated communication network for posting. In some examples, a user may create content for posting to one or more communication networks and send the content over a network for posting to a first communication network. Upon receipt of the content for posting, the first communication network may identify a context of the received content and may associate the context with a second communication network based on a set of content forwarding rules. The first communication network may automatically forward the received content to the associated second communication network for posting at the second communication network. Additionally, a third party entity may be configured to monitor content received at a first communication network, identify a context of the received content, and automatically forward the received content to the associated second communication network for posting.

17 Claims, 6 Drawing Sheets

(56) References Cited

U.S. PATENT DOCUMENTS

| | | | |
|---|---|---|---|
| 8,327,012 B1* | 12/2012 | Nguyen | H04N 21/23103 709/226 |
| 8,434,150 B2* | 4/2013 | Xie | H04L 63/145 709/206 |
| 8,793,319 B2* | 7/2014 | Turski | G06Q 10/107 705/319 |
| 8,904,295 B2* | 12/2014 | Whalin | G06F 17/30964 715/753 |
| 9,117,203 B2* | 8/2015 | Reilly | G06Q 10/107 |
| 9,215,236 B2* | 12/2015 | Kennedy | G06F 21/55 |
| 2009/0327868 A1* | 12/2009 | Tsukikawa | G06F 9/541 715/239 |
| 2010/0312842 A1* | 12/2010 | Ladouceur | G06Q 10/10 709/206 |
| 2010/0325207 A1* | 12/2010 | Churchill | H04L 51/14 709/204 |
| 2011/0029370 A1 | 2/2011 | Roeding et al. | |
| 2011/0047117 A1* | 2/2011 | Sinha | G06F 9/543 706/47 |
| 2011/0173214 A1* | 7/2011 | Karim | G06F 17/3002 707/754 |
| 2011/0258561 A1* | 10/2011 | Ladouceur | G06Q 10/103 715/753 |
| 2011/0264528 A1 | 10/2011 | Whale | |
| 2011/0264768 A1* | 10/2011 | Walker | H04N 21/00 709/218 |
| 2012/0019365 A1* | 1/2012 | Tuikka | G06Q 30/02 340/10.1 |
| 2012/0030210 A1 | 2/2012 | Sankhla et al. | |
| 2012/0102114 A1 | 4/2012 | Dunn et al. | |
| 2012/0124176 A1 | 5/2012 | Curtis et al. | |
| 2012/0246191 A1* | 9/2012 | Xiong | G06Q 50/01 707/769 |
| 2013/0091582 A1* | 4/2013 | Chen | G06Q 10/10 726/26 |
| 2013/0297469 A1* | 11/2013 | Spittle | G06Q 10/10 705/35 |
| 2014/0025737 A1* | 1/2014 | Kruglick | H04L 67/22 709/204 |

OTHER PUBLICATIONS

International Search Report and Written Opinion for PCT/US 12/43067, filed Jun. 19, 2012, mailed on Aug. 31, 2012.

"About ifttt," accessed at http://web.archive.org/web/20120504000858/http://ifttt.com/wtf, accessed on Jan. 6, 2015, pp. 1-3.

"Post Same Text on Multiple Social Network Websites From Android Phone With Multipost," accessed at http://web.archive.org/web/20120510200618/http://appstouse.com/post-same-text-on-multiple-social-network-websites-from-android-phone-with-multipost/3671, accessed on Jan. 6, 2015, pp. 1-3.

"Writing VBA code for Microsoft Outlook," accessed at http://web.archive.org/web/20120610064053/http://www.outlookcode.com/article.aspx?ID=40, accessed on Jan. 6, 2015, pp. 1-2.

* cited by examiner

AUTOMATIC CONTENT FORWARDING TO COMMUNICATION NETWORKS OF CONTENT POSTED FROM A USER

CROSS-REFERENCE TO RELATED APPLICATION

This application is the U.S. National Stage filing under 35 U.S.C. §371 of PCT Application Ser. No. PCT/US12/43067 filed on Jun. 19, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

In a networked environment, users may provide content updates to multiple communication networks including social networks, professional networks, blogs, websites, and email providers. Often times a content update may include information such as personal information including the user's feelings, whereabouts, or actions, as well as professional information. The user may wish to update multiple communication networks concurrently, and typically the user may have to access each network separately in order to provide the content update to each communication network. Updating content at each communication network individually may be time consuming and inefficient when the user is a member of multiple social networks, professional networks and blogs.

SUMMARY

The present disclosure generally describes techniques for automatically posting content to a communication network based on context. According to some embodiments, the present disclosure provides a method for automatically posting content to a communication network based on context. The method may include receiving content for posting, identifying a context of the content, associating the context with one or more communication networks, and automatically posting the content to the one or more communication networks based on the context.

According to other embodiments, the present disclosure also provides a server for automatically posting content to a communication network based on context. The server may include a memory configured to store instructions and a processor configured to execute a content management application in conjunction with the instructions stored in the memory. The content management application may be configured to receive content for posting, identify a context of the content, associate the context with one or more communication networks, and automatically post the content to the one or more communication networks based on the context.

According to further embodiments, the present disclosure also describes a computer readable memory device with instructions stored thereon for automatically posting content to a communication network. The instructions may include receiving content for posting, identifying a context of the content, associating the context with one or more communication networks, and automatically posting the content to the one or more communication networks based on the context.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to automatically forwarding content updates to communication networks.

Briefly stated, technologies are provided for identifying a context associated with received content and automatically forwarding the content to an associated communication network for posting. A user may create content for posting to one or more communication networks and may send the content over a network for posting to a first communication network. Upon receipt of the content for posting, the first communication network may identify a context of the received content and may associate the context with a second communication network based on a set of content forwarding rules. The first communication network may automatically forward the received content to the associated second communication network for posting at the second communication network.

Additionally, a third party entity may be configured to monitor content received at a first communication network, identify a context of the received content, and automatically forward the received content to the associated second communication network for posting.

Figure 1:
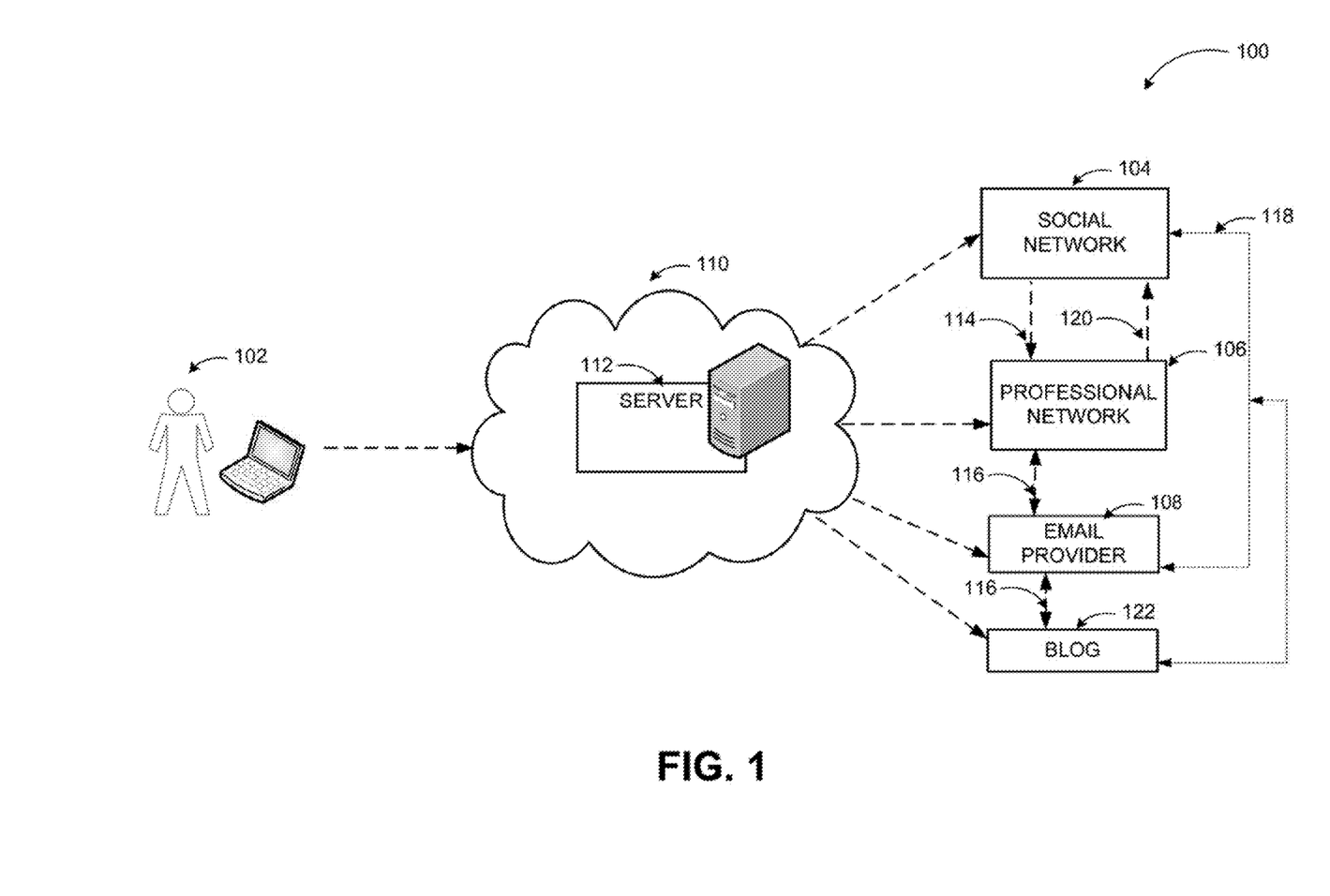
FIG. 1 conceptually illustrates an example system for automatically posting content updates to communication networks based on a context.

FIG. 1 conceptually illustrates an example system for automatically posting content updates to communication networks based on a context, arranged in accordance with at least some embodiments described herein. As demonstrated in a diagram 100, a networked environment 110 may provide a variety of communication networks for enabling a user 102 to post and share information to a communication network. An example communication network may include a social network 104, a professional network 106, a blog 122, and an email provider 108 as some examples. A server 112 associated with the networked environment 110 may enable the user 102 to post content such as a status update, personal information, professional information, comments, and personal messages directly to a selected communication network via a web browser and/or application associated with the user's client device. The client device may host a platform for enabling the user 102 to post content over the networked environment 110 to the communication network as posting, an instant message (e.g., Short Message Service "SMS" message), and/or an email message directly from the client device. The client device may also be configured to enable the user 102 to post audio/visual recordings to the one or more communication networks, including pictures, videos and audio files. A posting may also include a location (e.g., via Global Positioning Service "GPS" or similar means) or other sensor-driven data such as presence, heart rate, blood pressure, etc.).

In a typical scenario, the user 102 may directly post content associated with a selected communication network to each associated communication network individually. For example, if the user 102 desires to post a status update to the social network 104, the user 102 may directly access the selected social network 104 for posting the status update. If the user 102 desires to additionally post the status update to the professional network 106, the user 102 may separately access the professional network 106 and directly post the status update to the professional network 106.

A system according to some embodiments may enable the user 102 to post content to a single communication network, and the content may be automatically forwarded to the appropriate communication network or networks associated with the content. In an example scenario, the user 102 may create content for posting to a communication network. The content may include information related to the social network 104, such as a status update which may include information about the user's feelings, whereabouts, or actions, and the content may also include information related to the professional network 106, such as information about work or school, for example.

In an example embodiment, the user 102 may select a communication network, such as the social network 104, for initially posting the content, and the content may be forwarded (114) from the communication network which initially receives the content for posting to a second communication network. When the communication network receives the content for posting from the user 102, the communication network which receives the content may identify a context of the content to determine whether the content should be forwarded to a second communication network which associated with the context of the content. For example, if the user posts the content to the social network 104, the social network may identify the context of the received content, and may determine if the content is associated with a second communication network, such as the professional network 106. If the social network 104 associates the context of the content with the professional network 106, the social network 104 may automatically forward (114) the content to the professional network 106 for posting.

In another example embodiment, when the content is initially posted and received at a first communication network, a second communication network may be configured to monitor the communication network which receives the content, and the second communication network may automatically retrieve (120) the content for posting at the second communication network. For example, when the content is received at the social network 104, the professional network 106 may be configured to monitor the content received at the social network 104, identify a context of the received content, and if the context is associated with the professional network 106, the professional network may retrieve (120) the content for posting at the professional network.

In a further example embodiment, the content for posting may be received as an email message at an email provider 108 associated with the networked environment 110. The user 102 may create content for posting to one or more communication networks, such as the social network 104, the professional network 106, and the blog 122, for example, and the user may send the content in an email message to the email provider 108. The email provider may be configured to identify the context of the content, associate the context with one or more communication networks and forward (116, 118) the content to the associated communication networks for posting. Likewise, as previously discussed, the social network 104 and the professional network 106 may also be configured to monitor email messages received at the email provider 108 containing content for posting, and if the monitoring communication networks, such as the social network 104 and the professional network 106, associate the context of the content with the social network 104 and/or the professional network 106, the social network 104 and/or the professional network 106 may be configured to retrieve the content from the email provider 108 for posting at the social network 104 and/or the professional network 106.

In some examples, a verification operation may precede the actual posting. For example, the posting user may be notified where the posting would be sent to and asked to approve or reject the proposed action(s). The verification operation may be a default action by the system or a predefined rule by the user, where the user can specify which types of posts, which communication network(s), and other circumstances are to trigger the verification operation.

Figure 2:
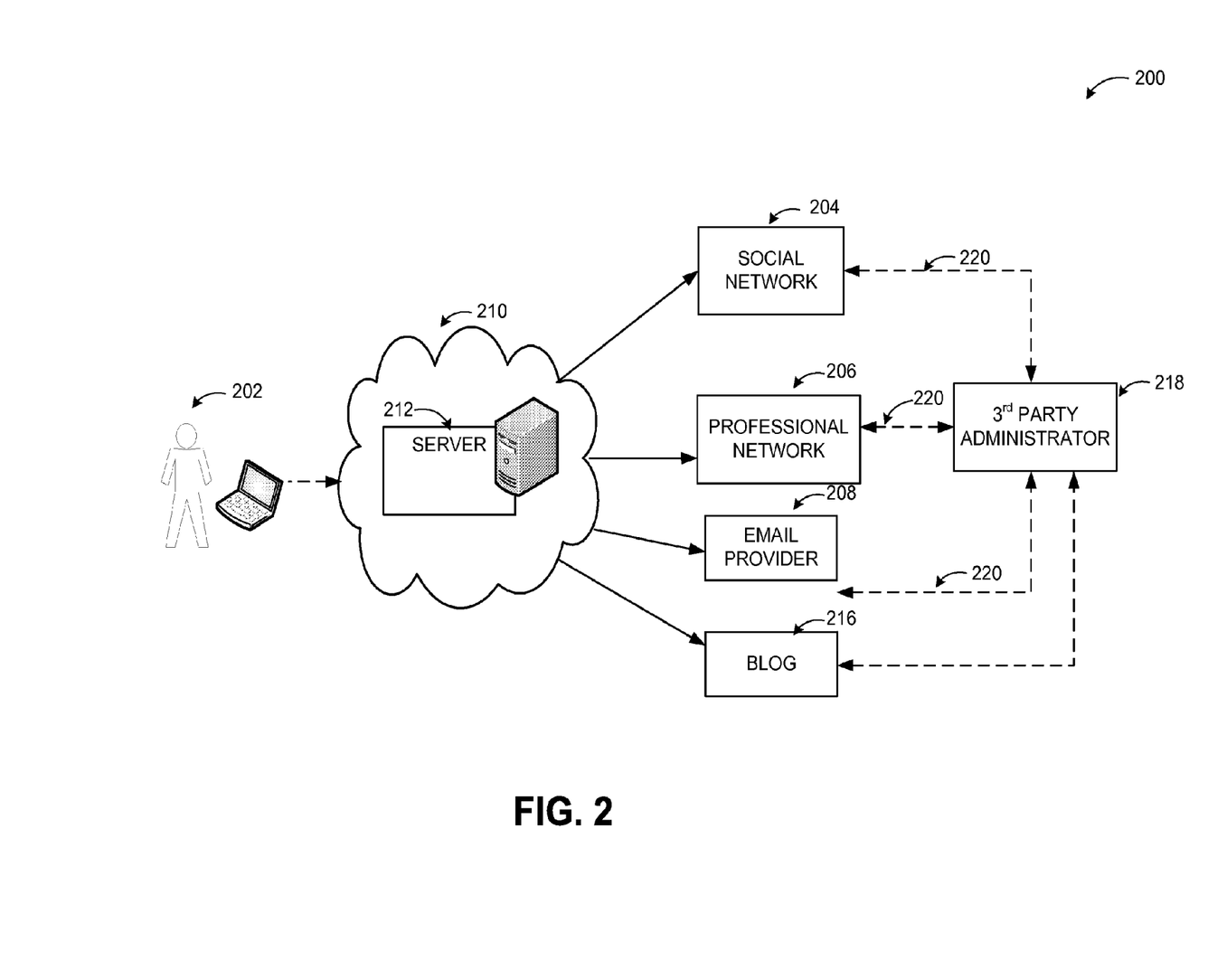
FIG. 2 illustrates an example scenario of a third party administrator configured to monitor and post content updates to communication networks.

FIG. 2 illustrates an example scenario of a third party administrator configured to monitor and post content updates to communication networks, arranged in accordance with at least some embodiments described herein. As shown in a diagram 200, a user 202 may create content for posting to one or more communication networks, and the user 202 may post the content via a server 212 associated with a network 210 to the one or more communication networks. The communication networks may include a social network 204, a professional network 206, a blog 216, and an email provider 208, as some examples. In an example scenario, the user 202 may post the content to a selected communication network, such as the social network 204. The content posted at the social network 204 may include information associated with the social network 204 as well as additional communication networks such as the professional network 206 and other similar networks. The user 202 may desire for the content to be automatically forwarded and posted to the additional communication networks associated with the content.

In an example embodiment, when the content is initially posted by the user 202 and received at a first communication network, a third party administrator 218 may be configured to monitor the communication network which receives the content and to automatically retrieve (220) the content for posting at an associated communication network. For example, the user 202 may initially post content to the social network 204. The third party administrator 218 may be configured to monitor the received content at the social network 204, and to identify the context of the received content. The third party administrator 218 may determine if the context is associated with a second communication network, such as the professional network 206, and the third party administrator 218 may retrieve (220) the content from the social network 204 and automatically forward the associated content to the professional network 206. Similarly, as previously described, the user 202 may send the content for posting in an email message to the email provider 208, and the third party administrator 218 may monitor email messages received at the email provider 208 for identifying content for posting. The third party administrator 218 may associate the context of the content of the email messages with one or more communication networks, and may retrieve (220) the content from the email provider 208 and forward the content to the associated communication networks.

In a system according to embodiments, the context of the content for posting may be associated with one or more communication networks based on a set of predefined content forwarding rules. Some example content forwarding rules may provide that if the context of the content includes certain keywords and/or hash-tags, then the context of the content may be associated with a certain communication network. For example, a content forwarding rule may provide that if the identified context of the content includes keywords related to the professional network 206, such as work, job, and/or business terms, then the content may be automatically forwarded to the professional network 206. Similarly, keywords included in the content related to the social network, such as friends, social activities, and other non-work related keywords, may trigger the content for forwarding to the social network 204.

In an additional embodiment, the content forwarding rules may include forwarding the content to a certain communication network based on a time, a date, and a location of when and where the content is posted by the user 202. For example, a content forwarding rule may provide that if the user 202 posts content during work hours, the content may be automatically forwarded to the professional network 206. Additionally, if the content is posted during work hours, the system may prevent the content from being automatically posted to the social network 204. Likewise, if the user 202 posts content during non-working hours, such as over the weekend and/or during evening hours, the content may be automatically forwarded to the social network 204, and may be prevented from being posted to the professional network 206.

Further, the content forwarding rules may provide that the content may be automatically posted to a communication network based on a location of the user 202 when the content is posted. For example, if the user 202 posts content from the user's workplace, or another location associated with the user's work, such as a conference center, meeting hall, or other office, the content may be automatically forwarded to the professional network. Similarly, if the content is posted from a location outside of the work place, such as the user's home or a social and/or recreational location, then the content may be automatically posted to the social network 204 and may be prevented from being posted to the professional network 206. The content forwarding rules may be predefined by one of the communication networks, such as the social network 204, the professional network 206, the email provider, and the blog 216.

Additionally, the third party administrator 218 configured to monitor the communication networks may define content forwarding rules for retrieving content and forwarding to a communication network. Further, the user 202 may be able to customize the content forwarding rules for defining when and how the context of the content may be associated with and automatically forwarded to the one or more communication networks.

Figure 3:
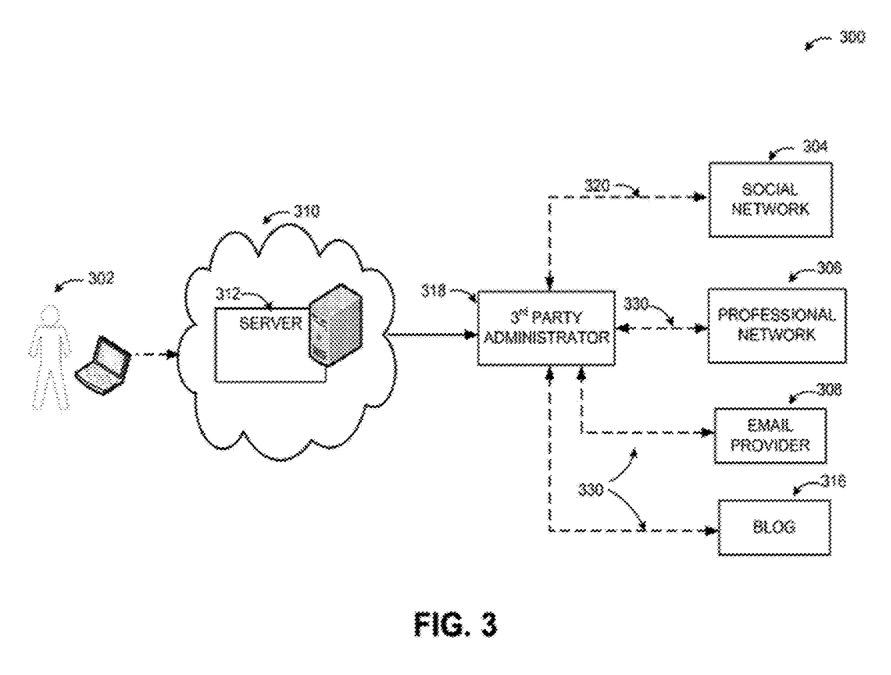
FIG. 3 illustrates an example scenario of updating content at a third party administrator for automatically posting content updates to communication networks.

FIG. 3 illustrates an example scenario of updating content at a third party administrator for automatically posting content updates to communication networks, arranged in accordance with at least some embodiments described herein. As demonstrated in a diagram 300, a user 302 may create content for posting to one or more communication networks, such as a social network 304, a professional network 306, a blog 316, and an email provider 308 for example. In a system according to embodiments, the user 302 may create the content for posting, and the user 302 may send the content via a server 312 associated with a network 310 to a third party administrator 318. The content for posting such as a status update, a generic posting, an instant message, an email message, and/or as audio/visual content, as some examples, may be sent directly to the third party administrator 318.

In an example embodiment, the third party administrator 318 may be configured to identify the context of the received content and associate the context with one or more communication networks based on multiple content forwarding rules. The third party administrator 318 may also be configured to forward (320) the content to the associated communication networks for posting. For example, if the third party administrator 318 associates the context of the content with the social network 304, the third party administrator 318 may forward (320) the content to the social network 304 for posting. Likewise, if the third party administrator 318 associates the context of the content with the blog 316 and/or with the professional network 306, the third party administrator 318 may forward (330) the content to the blog 316 and/or with the professional network 306 for posting.

In another example embodiment, the user 302 may tag the content before posting the content to the third party administrator 318, for indicating to which communication networks the user 302 intends the content to be posted. For example, when sending the content to the third party administrator 318, the user 302 may specify that the content should be posted to the professional network 306 and a particular blog, but not to the social network 304. The third party administrator 318 may forward the content according to the user 302 specifications. Additionally, when the third party administrator 318 receives the content for posting, the third party administrator 318 may identify a persona, such as a user name and/or user account, associated with the user 302. The third party administrator 318 may determine if the user name and/or user account may be associated with one of the communication networks, such as the social network 304, the professional network 306, the blog 316, and/or the email provider 308, and the third party administrator 318 may automatically forward the content to the communication network associated with the user name and/or user account.

Figure 4:
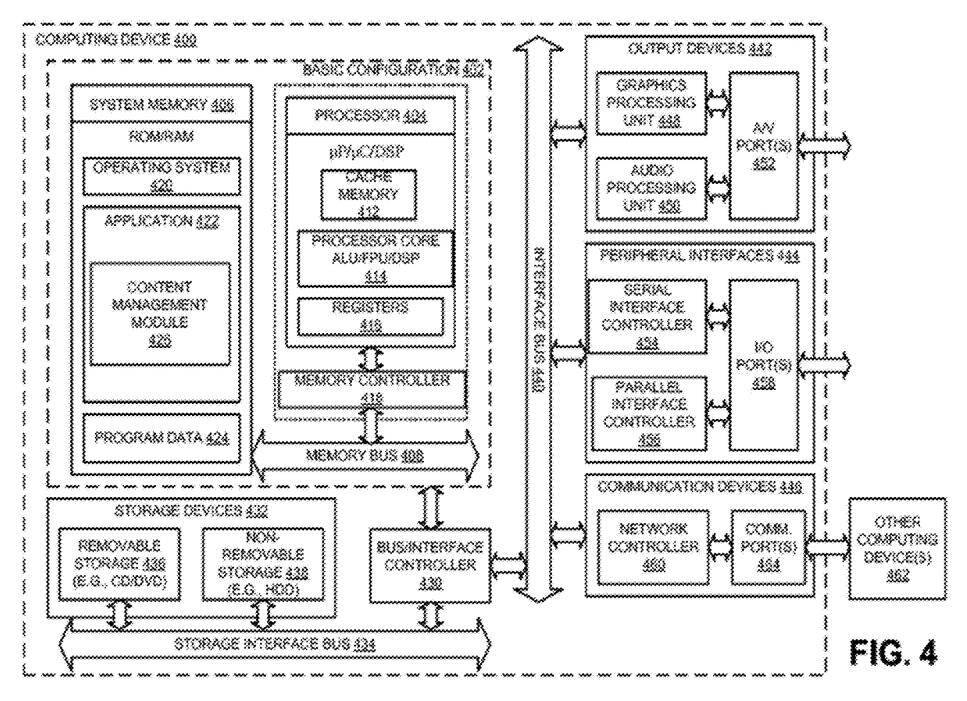
FIG. 4 illustrates a general purpose computing device, which may be used for automatically posting content to a communication network based on context.

FIG. 4 illustrates a general purpose computing device, which may be used for automatically posting content to a communication network based on context, arranged in accordance with at least some embodiments described herein. In a very basic configuration 402, a computing device 400 typically includes one or more processors 404 and a system memory 406. A memory bus 408 may be used for communicating between a processor 404 and a system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a cache memory 412, a processor core 414, and one or more registers 416. An example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, one or more applications 422, and program data 424. The application 422 may include a content management module 426 that is arranged to identify a context associated with retrieved content and forward the content to an associated communication network for posting. Program data 424 may include content forwarding rules, identified context of content for posting, and similar data. The program data 424 may be useful in associating identified context of content for posting with one or more communication networks and forwarding the content to the associated communication networks. This described basic configuration 402 is illustrated in FIG. 4 by those components within the inner dashed line.

The computing device 400 may have additional features or functionality, and additional interfaces to facilitate communications between the basic configuration 402 and any required devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (e.g., output devices 442, peripheral interfaces 444, and communication devices 446) to the basic configuration 402 via the bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations. Moreover the computing device 400 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
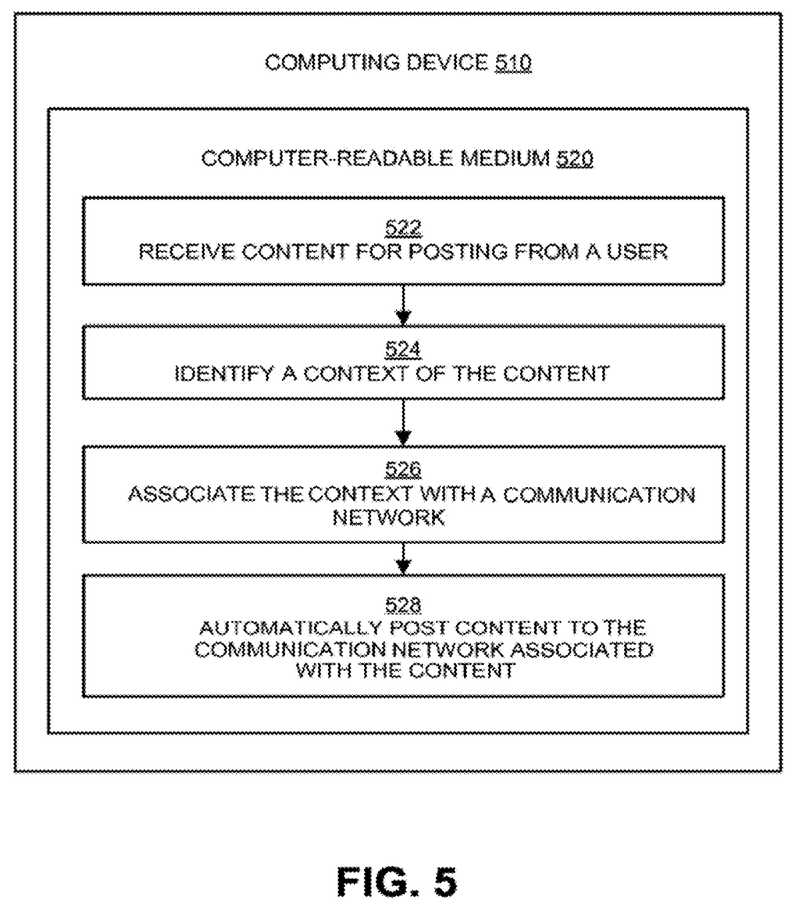
FIG. 5 is a flow diagram illustrating an example method that may be performed by a computing device such as the computing device in FIG. 4.

FIG. 5 is a flow diagram illustrating an example method that may be performed by a computing device such as the computing device in FIG. 4, arranged in accordance with at least some embodiments described herein.

Example methods may include one or more operations, functions or actions as illustrated by one or more of blocks 522, 524, 526 and/or 528. The operations described in blocks 522 through 528 may also be stored as computer-executable instructions in a computer-readable medium such as a computer-readable medium 520 of a computing device 510.

A process for identifying a context associated with received content and automatically forwarding the content to an associated communication network for posting may begin with block 522, "RECEIVE CONTENT FOR POSTING FROM A USER."

At block 522, a user may create content for posting at a communication network which may include a social network, a professional network, a blog, an email provider and similar networks.

Block 522 may be followed by block 524, "IDENTIFY A CONTEXT OF THE CONTENT." At block 524, the content may be received at a first communication network where the context of the received content may be identified. In an additional embodiment, a third party administrator may receive the content and may identify a context of the received content.

Block 524 may be followed by block 526, "ASSOCIATE THE CONTEXT WITH A COMMUNICATION NETWORK." At block 526, the first communication network and/or the third party administrator may associate the context of the received content with one or more additional communication networks based on one or more content forwarding rules.

Block 526 may be followed by block 528, "AUTOMATICALLY POST CONTENT TO THE COMMUNICATION NETWORK ASSOCIATED WITH THE CONTENT." At block 528, the first communication network and/or the third party administrator may automatically forward the content to the associated communication network and the content may be automatically posted at the associated communication network.

The blocks included in the above described process are for illustration purposes. Identifying a context of received content and automatically forwarding the content to one or more associated communication networks may be performed by similar processes with fewer or additional blocks. In some examples, the blocks may be performed in a different order. In some other examples, various blocks may be eliminated. In still other examples, various blocks may be divided into additional blocks, or combined together into fewer blocks. Although illustrated as sequentially ordered operations, in some implementations the various operations may be performed in a different order, or in some cases various operations may be performed at substantially the same time.

Figure 6:
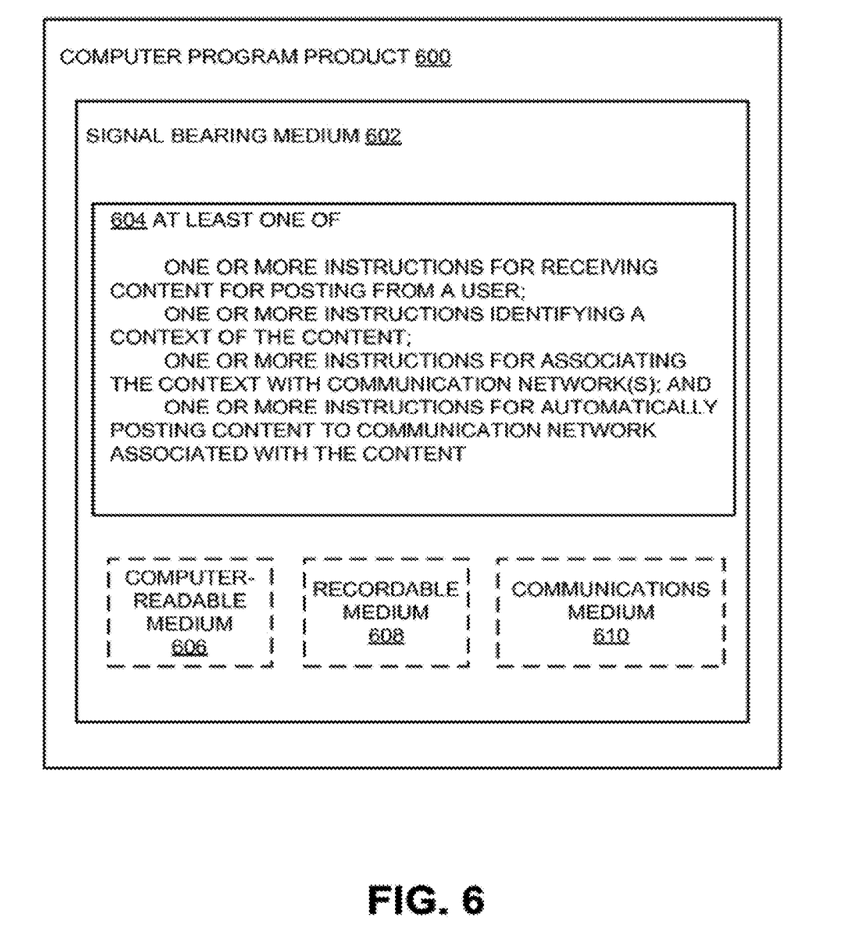
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, a computer program product 600 may include a signal bearing medium 602 that may also include machine readable instructions 604 that, when executed by, for example, a processor, may provide the functionality described above with respect to FIG. 4 and FIG. 5. Thus, for example, referring to the processor 404, the content management module 426 may undertake one or more of the tasks shown in FIG. 4 in response to the instructions 604 conveyed to the processor 404 by the signal bearing medium 602 to perform actions associated with automatically forwarding content for posting to one or more communication networks as described herein. Some of those instructions may include receiving content for posting from a user, identifying a context of the content, associating the context with one or more communication networks, and automatically posting the content to the one or more communication networks associated with the content.

In some implementations, the signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the computer program product 600 may be conveyed to one or more modules of the processor 404 by an RF signal bearing medium, where the signal bearing medium 602 is conveyed by a wireless communications medium 610 (e.g., a wireless communications medium conforming with the IEEE 802.11 standard).

The present disclosure provides a method for automatically posting content to a communication network based on context. The method may include receiving content for posting, identifying a context of the content, associating the context with one or more communication networks, and automatically posting the content to the one or more communication networks based on the context. The one or more communication networks may include a social network, a professional network, and/or a blog.

According to some embodiments, the method may include receiving the content at a first communication network, associating the context with a second communication network, and forwarding the content to the second communication network for posting from the first communication network. The method may also include receiving the content at a first communication network, enabling a second communication network to monitor the content at the first communication network, and if the second communication network associates the context with the second communication network, enabling the second communication network to retrieve the content from the first communication network for posting at the second communication network. The content may be received at a third party entity and posted to the one or more communication networks by the third party entity based on the context.

According to some embodiments, the method may include receiving the content as one of: an email message, a posting, an instant message, an audio recording, or a video recording. The method may also include enabling a selection among multiple rules for associating the context with the one or more communication networks. The method may further include enabling a definition of one or more rules for associating the context with the one or more communication networks. The method may also include enabling a customization of one or more of the plurality of rules for associating the context with the one or more communication networks. The plurality of rules may include exclusionary rules and/or inclusionary rules.

According to other embodiments, the method may include associating the context with the one or more communication networks based on one or more key words identified in the content. The method may include associating the context with the one or more communication networks based on a time of day and/or a day of week of when the content is received. The method may also include if the content is received during work hours, automatically posting the content to a professional network and preventing the content from automatically posting to a social network, and if the content is received outside work hours, automatically posting the content to the social network and preventing the content from automatically posting to the professional network.

According to further embodiments, the method may include associating the context with the one or more communication networks based on a location of a user posting the content when the content is received. The method may also include if the content is received from a work place, automatically posting the content to a professional network and preventing the content from automatically posting to a social network, and if the content is received outside of the work place, automatically posting the content to the social network and preventing the content from automatically posting to the professional network.

According to yet other embodiments, the method may also include enabling a tagging of the content for associating the context with the one or more communication networks. The method may also include identifying a persona associated with received content, associating the persona with the one or more communication networks, and automatically posting the content update to the one or more communication networks associated with the identified persona.

The present disclosure also provides a server for automatically posting content to a communication network based on context. The server may include a memory configured to store instructions and a processor configured to execute a content management application in conjunction with the instructions stored in the memory. The content management application may be configured to receive content for posting, identify a context of the content, associate the context with one or more communication networks, and automatically post the content to the one or more communication networks based on the context. The one or more communication networks may include a social network, a professional network, and/or a blog.

According to some embodiments, the server may be part of a first communication network and may be further configured to associate the context with a second communication network, and forward the content to the second communication network for posting from the first communication network.

According to some embodiments, the server may be part of a second communication network and may be further configured to monitor the content received at a first communication network, and upon associating the context with the second communication network, retrieve the content from the first communication network for posting at the second communication network.

According to some embodiments, the server may be part of a third party entity and may be further configured to receive the content for posting, determine if the context is associated with one of a first communication network or a second communication network, and post the content to the one of the first communication network or the second communication network based on the determination.

According to some embodiments, the content management application may be further configured to receive the content as one of: an email message, a posting, an instant message, an audio recording, or a video recording. The content management application may be further configured to enable a selection among multiple rules for associating the context with the one or more communication networks. The content management application may be further configured to enable a definition of one or more rules for associating the context with the one or more communication networks. The content management application may be further configured to enable a customization of one or more of the plurality of rules for associating the context with the one or more communication networks. The plurality of rules may include exclusionary rules and/or inclusionary rules.

According to other embodiments, the content management application may be further configured to associate the context with the one or more communication networks based on one or more key words identified in the content. The content management application may be further configured to associate the context with the one or more communication networks based on a time of day and/or a day of week of when the content is received. The content management application may be further configured to if the content is received during work hours, automatically post the content to a professional network and prevent the content from automatically posting to a social network, and if the content is received outside work hours, automatically post the content to the social network and prevent the content from automatically posting to the professional network.

According to other embodiments, the content management application may be further configured to associate the context with the one or more communication networks based on a location of a user posting the content when the content is received. The content management application may be further configured to if the content is received from a work place, automatically post the content to a professional network and prevent the content from automatically posting to a social network, and if the content is received outside of the work place, automatically post the content to the social network and prevent the content from automatically posting to the professional network.

According to other embodiments, the content management application may be further configured to enable a tagging of the content for associating the context with the one or more communication networks. The content management application may be further configured to identify a persona associated with received content, associate the persona with the one or more communication networks, and automatically post the content update to the one or more communication networks associated with the identified persona.

The present disclosure also describes a computer readable memory device with instructions stored thereon for automatically posting content to a communication network. The instructions may include receiving content for posting, identifying a context of the content, associating the context with one or more communication networks, and automatically posting the content to the one or more communication networks based on the context. The one or more communication networks may include a social network, a professional network, and/or a blog.

According to some embodiments, the instructions may include receiving the content at a first communication network, associating the context with a second communication network, and forwarding the content to the second communication network for posting from the first communication network. The instructions may also include receiving the content at a first communication network, enabling a second communication network to monitor the content at the first communication network, and if the second communication network associates the context with the second communication network, enabling the second communication network to retrieve the content from the first communication network for posting at the second communication network. The content may be received at a third party entity and posted to the one or more communication networks by the third party entity based on the context.

According to some embodiments, the instructions may include receiving the content as one of: an email message, a posting, an instant message, an audio recording, or a video recording. The instructions may also include enabling a selection among multiple rules for associating the context with the one or more communication networks. The instructions may further include enabling a definition of one or more rules for associating the context with the one or more communication networks. The instructions may also include enabling a customization of one or more of the plurality of rules for associating the context with the one or more communication networks. The plurality of rules may include exclusionary rules and/or inclusionary rules.

According to other embodiments, the instructions may include associating the context with the one or more communication networks based on one or more key words identified in the content. The instructions may include associating the context with the one or more communication networks based on a time of day and/or a day of week of when the content is received. The instructions may also include if the content is received during work hours, automatically posting the content to a professional network and preventing the content from automatically posting to a social network, and if the content is received outside work hours, automatically posting the content to the social network and preventing the content from automatically posting to the professional network.

According to further embodiments, the instructions may include associating the context with the one or more communication networks based on a location of a user posting the content when the content is received. The instructions may also include if the content is received from a work place, automatically posting the content to a professional network and preventing the content from automatically posting to a social network, and if the content is received outside of the work place, automatically posting the content to the social network and preventing the content from automatically posting to the professional network.

According to yet other embodiments, the instructions may also include enabling a tagging of the content for associating the context with the one or more communication networks. The instructions may also include identifying a persona associated with received content, associating the persona with the one or more communication networks, and automatically posting the content update to the one or more communication networks associated with the identified persona.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed in a computing device to automatically post content to one or more communication networks based on a context, the method comprising:
    receiving the content to post;
    identifying the context of the content, wherein the context includes one or more of: a location where the content is posted, a time when the content is posted, a date when the content is posted, and keywords identified in the content;
    providing a user interface to customize content forwarding rules, wherein the content forwarding rules are arranged to associate the context with the one or more communication networks;
    providing another user interface to define parameters that prompt a verification operation prior to posting of the content to the one or more communication networks, wherein the parameters include one or more of: a type of the content, a type of the one or more communication networks, and a type of the context;
    in response to a detection of one or more of the defined parameters,
        trigger the verification operation to notify the user of a proposed action to post the content to the one or more communication networks; and
        request an approval response or a denial response to the action;
    in response to a detection of the approval response to the action, posting the content to the one or more communication networks based on the context;
    in response to a determination that the content is received during work hours,
        automatically posting the content to a professional network; and preventing the content from automatically posting to a social network; and providing a further user interface to tag the content prior to posting the content to a third party entity, wherein the third party entity is arranged to monitor and post the content to a particular one or more communication networks based on the tag.

2. The method of claim 1, further comprising:
receiving the content at a first communication network;
associating the context with a second communication network; and
forwarding the content to the second communication network to post from the first communication network.

3. The method of claim 1, further comprising:
receiving the content at a first communication network;
enabling a second communication network to monitor the content at the first communication network; and
in response to a determination that the second communication network associates the context with the second communication network, enabling the second communication network to retrieve the content from the first communication network to post at the second communication network.

4. The method of claim 1, further comprising:
receiving the content as one of an email message, a posting, an instant message, an audio recording, or a video recording.

5. The method of claim 1, further comprising:
enabling a selection among the content forwarding rules to associate the context with the one or more communication networks.

6. The method of claim 5, further comprising:
enabling a definition of the content forwarding rules to associate the context with the one or more communication networks.

7. The method of claim 5, wherein the content forwarding rules include one or more of: exclusionary rules and inclusionary rules.

8. A server to automatically post content to one or more communication networks based on a context, the server comprising:
a memory configured to store instructions;
a processor configured to execute a content management application in conjunction with the instructions stored in the memory; wherein the content management application is configured to:
receive the content to post;
identify the context of the content, wherein the context includes one or more of:
a location where the content is posted, a time when the content is posted, a date when the content is posted, and keywords identified in the content;
provide a user interface to customize content forwarding rules, wherein the content forwarding rules are arranged to associate the context with the one or more communication networks;
provide another user interface to define parameters that prompt a verification operation prior to posting of the content to the one or more communication networks, wherein the parameters include one or more of a type of the content, a type of the one or more communication networks, and a type of the context;
in response to a detection of one or more of the defined parameters,
trigger the verification operation to notify the user of a proposed action to post the content to the one or more communication networks; and
request an approval response or a denial response to the action;
in response to a detection of the approval response to the action, post the content to the one or more communication networks based on the context;
in response to a determination that the content is received during work hours,
automatically post the content to a professional network; and
prevent the content from automatically posting to a social network; and
provide a further user interface to tag the content prior to posting the content to a third party entity, wherein the third party entity is arranged to monitor and post the content to a particular one or more communication networks based on the tag.

9. The server of claim 8, wherein the one or more communication networks include at least one of: the social network, the professional network, and a biog.

10. The server of claim 8, wherein the content management application is further configured to:
associate the context with the one or more communication networks based on one or more keywords identified in the content.

11. The server of claim 8, wherein the content management application is further configured to:
associate the context with the one or more communication networks based on at least one of: a time of day and a day of week of when the content is received.

12. The server of claim 11, wherein the content management application is further configured to:
in response to a determination that the content is received outside work hours, automatically post the content to the social network and prevent the content from automatically posting to the professional network.

13. The server of claim 8, wherein the content management application is further configured to
associate the context with the one or more communication networks based on a location of a user that posts the content when the content is received.

14. The server of claim 13, wherein the content management application is further configured to:
in response to a determination that the content is received from a work place, automatically post the content to a professional network and prevent the content from automatically posting to a social network; and
in response to a determination that the content is received outside of the work place, automatically post the content to the social network and prevent the content from automatically posting to the professional network.

15. The server of claim 8, wherein the content management application is further configured to:
identify a persona associated with received content;
associate the persona with the one or more communication networks; and
automatically post the content update to the one or more communication networks associated with the identified persona.

16. A computer readable memory device with instructions stored thereon to automatically post content to one or more communication networks, the instructions comprising:
receiving the content to post;
identifying a context of the content, wherein the context includes one or more of a location where the content is posted, a time when the content is posted, a date when the content is posted, and keywords identified in the content;

providing a user interface to customize content forwarding rules, wherein the content forwarding rules are arranged to associate the context with the one or more communication networks;

providing another user interface to define parameters that prompt a verification operation prior to posting of the content to the one or more communication networks, wherein the parameters include one or more of: a type of the content, a type of the one or more communication networks, and a type of the context;

in response to a detection of one or more of the defined parameters,
  trigger the verification operation to notify the user of a proposed action to post the content to the one or more communication networks; and
  request an approval response or a denial response to the action;

in response to a detection of the approval response to the action, posting the content to the one or more communication networks based on the context; and in response to a determination that the content is received during work hours,
  automatically posting the content to a professional network; and
  preventing the content from automatically posting to a social network; and providing a further user interface to tag the content prior the content to a third party entity, wherein the third party entity is arranged to monitor and post the content to a particular one or more communication networks based on the tag.

17. The computer readable memory device of claim 16, wherein the instructions further comprise:
  identifying a persona associated with received content;
  associating the persona with the one or more communication networks, and
  automatically posting the content update to the one or more communication networks associated with the identified persona.

* * * * *